(12) United States Patent
Hong et al.

(10) Patent No.: US 12,359,796 B2
(45) Date of Patent: Jul. 15, 2025

(54) INDUSTRIAL LIGHTING DEVICE HAVING SENSING FUNCTION

(71) Applicant: Xiamen PVTECH Co., Ltd., Fujian (CN)

(72) Inventors: Haibo Hong, Fujian (CN); Fuxing Lu, Fujian (CN); Liangliang Cao, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 50 days.

(21) Appl. No.: 18/138,141

(22) Filed: Apr. 24, 2023

(65) Prior Publication Data
US 2024/0240775 A1 Jul. 18, 2024

(30) Foreign Application Priority Data
Jan. 16, 2023 (CN) .......................... 202310067801.9

(51) Int. Cl.
*F21V 19/00* (2006.01)
*F21V 23/00* (2015.01)
(Continued)

(52) U.S. Cl.
CPC ........ *F21V 19/0035* (2013.01); *F21V 23/005* (2013.01); *F21V 23/045* (2013.01);
(Continued)

(58) Field of Classification Search
CPC .... F21V 23/006; F21V 23/007; F21V 23/008; F21V 23/009; F21V 23/023; F21V 23/0442–0492; F21V 29/70–83
See application file for complete search history.

(56) References Cited

U.S. PATENT DOCUMENTS

2010/0302758 A1   12/2010   Wang
2017/0219201 A1*   8/2017   Zhou ..................... H05B 45/10
(Continued)

FOREIGN PATENT DOCUMENTS

CN       109764276 A   *   5/2019
CN       112393149 A   *   2/2021   ................ F21S 8/00
(Continued)

OTHER PUBLICATIONS

Machine translation of CN 214663829 U retrieved from Espacenet. (Year: 2024).*

(Continued)

*Primary Examiner* — Colin J Cattanach
(74) *Attorney, Agent, or Firm* — Winston Hsu

(57) ABSTRACT

An industrial lighting device having sensing function is provided, which includes a driving module, a light-emitting module and a sensing module. The driving module includes a driving box and a driving box cover connected to each other. The driving box includes a circuit board and a sensing module connecting sheet disposed on the circuit board. The driving box cover has a sensing module installation hole. The light-emitting module has a driving module installation hole. The driving box cover passes through the driving module installation hole to fix the driving module at the light-emitting module. The sensing module is detachably disposed in the sensing module installation hole and contacts the sensing module connecting sheet so as to electrically connect to the circuit board.

7 Claims, 9 Drawing Sheets

(51) Int. Cl.
*F21V 23/04* (2006.01)
*F21V 29/76* (2015.01)
*F21V 29/77* (2015.01)
*F21V 31/00* (2006.01)

(52) U.S. Cl.
CPC ............ *F21V 29/76* (2015.01); *F21V 31/005* (2013.01); *F21V 29/77* (2015.01)

(56) References Cited

U.S. PATENT DOCUMENTS

| | | | |
|---|---|---|---|
| 2018/0231189 A1* | 8/2018 | Guo | F21V 29/507 |
| 2018/0259164 A1 | 9/2018 | Clements | |
| 2019/0249849 A1* | 8/2019 | Rodriguez | F21V 23/009 |
| 2019/0293267 A1* | 9/2019 | Marshal | F21V 23/0464 |
| 2020/0200378 A1* | 6/2020 | Stokes | F21V 29/745 |
| 2020/0300420 A1* | 9/2020 | Guo | F21V 23/009 |

FOREIGN PATENT DOCUMENTS

| | | | | |
|---|---|---|---|---|
| CN | 214249295 U | | 9/2021 | |
| CN | 214663829 U | * | 11/2021 | |
| CN | 214663830 U | | 11/2021 | |
| CN | 215174570 U | | 12/2021 | |
| CN | 216896959 U | * | 7/2022 | |
| EP | 2 096 901 A2 | | 9/2009 | |
| EP | 2 149 746 A2 | | 2/2010 | |
| KR | 20160133294 A | * | 11/2016 | ............ F21V 29/74 |
| WO | WO-2015100835 A1 | * | 7/2015 | ............ F21V 17/14 |

OTHER PUBLICATIONS

Machine translation of CN 216896959 U retrieved from the FIT database of PE2E search. (Year: 2024).*
Machine Translation of CN 112393149 A retrieved from the FIT database of PE2E search. (Year: 2024).*
Machine translation of CN 109764276 A retrieved from the FIT database of PE2E search. (Year: 2024).*
Machine translation of KR 20160133294 A retrieved from the FIT database of PE2E search. (Year: 2025).*
Machine translation of WO 2015100835 A1 retrieved from the FIT database of PE2E search. (Year: 2025).*

* cited by examiner

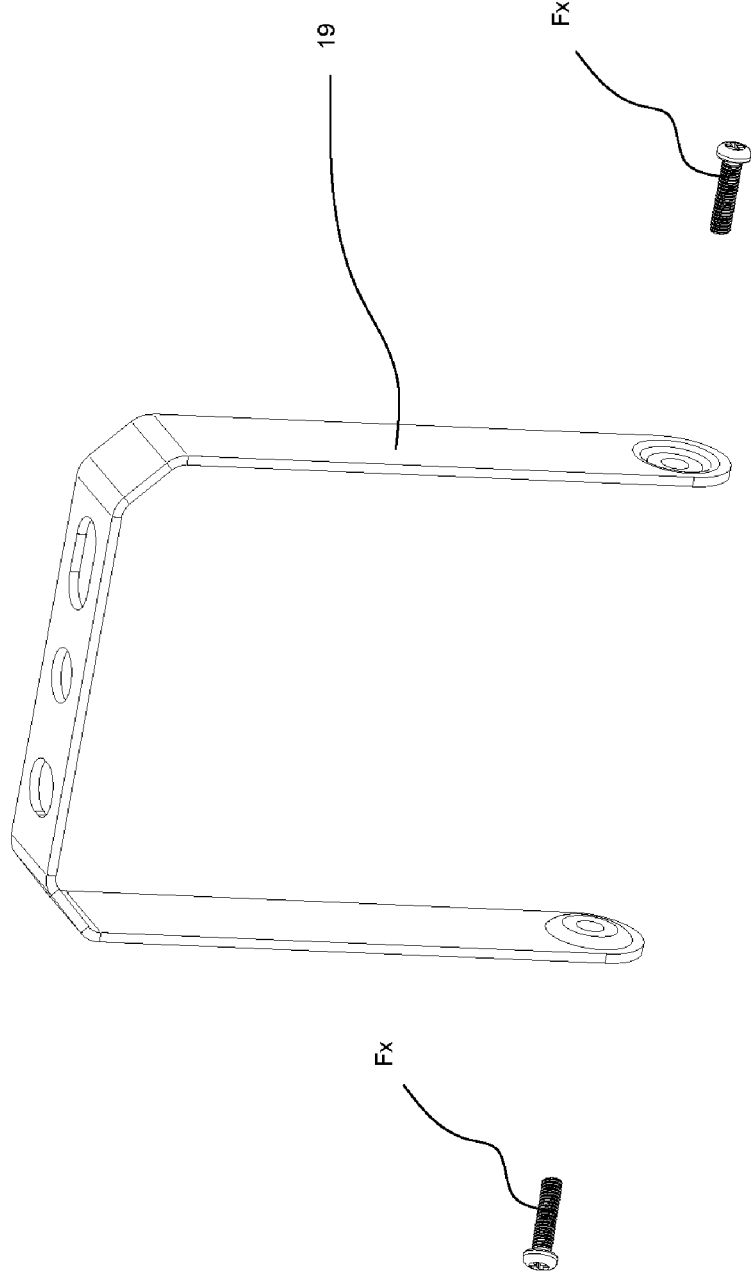

INDUSTRIAL LIGHTING DEVICE HAVING SENSING FUNCTION

BACKGROUND OF THE INVENTION

1. Field of the Invention

The present invention relates to an industrial lighting device, in particular to an industrial lighting device having sensing function.

2. Description of the Prior Art

The sensing functions of most of currently available industrial lighting devices (such as mining lamps, etc.) need to be realized by an external sensing base. However, the external sensing base will greatly increase the cost and manpower consumption in the manufacturing process of these industrial lighting device, Thus, the total cost of these industrial lighting devices is increased.

Most of the currently available industrial lighting devices with sensing function cannot provide the dimming function and the power regulation function at the same time, so the cost-performance ratio of these industrial lighting devices cannot be effectively increased. For the same reason, these industrial lighting devices cannot create great user experience.

The unified glare rating (UGR) of most currently available industrial lighting devices is between 28~30, which cannot meet the technical requirements of the standard UGR (<19), so there industrial lighting devices cannot increase the market competitiveness thereof.

Most of the currently available industrial lighting devices have only one type of fixing element, and different fixing mechanisms can be realized through additional adapter elements. The aforementioned adapter elements would incur additional cost. Therefore, the currently available industrial lighting devices cannot meet actual requirements.

SUMMARY OF THE INVENTION

One embodiment of the present invention provided an industrial lighting device having sensing function, which includes a driving module, a light-emitting module and a sensing module. The driving module has a driving box and a driving box cover connected to each other. The driving box has a circuit board and a sensing module connecting sheet disposed on the circuit board. The driving box cover has a sensing module installation hole. The light-emitting module has a driving module installation hole. The driving box cover passes through the driving module installation hole to fix the driving module at the light-emitting module. The sensing module is detachably disposed in the sensing module installation hole and contacts the sensing module connecting sheet so as to electrically connect to the circuit board.

In one embodiment, the industrial lighting device further includes a power adjusting module disposed on the circuit board. The driving box cover has a power adjusting module hole corresponding to the power adjusting module.

In one embodiment, the industrial lighting device further includes a dimming module disposed on the circuit board. The driving box cover has a dimming module hole corresponding to the dimming module.

In one embodiment, the industrial lighting device further includes two water-proof pads detachably disposed in the power adjusting module hole and the dimming module hole respectively.

In one embodiment, the industrial lighting device further includes a light cover disposed on the light-emitting module.

In one embodiment, the light-emitting module includes a heat radiator, a light source board and a lens, wherein the driving module installation hole is disposed at a center of the heat radiator, wherein the light source board and the lens are disposed at one side of the heat radiator, whereby the light source board is disposed between the lens and the heat radiator.

In one embodiment, the light-emitting module further includes an outer water-proof ring and an inner water-proof ring. The outer water-proof ring is disposed between the heat radiator and the light source board. The inner water-proof ring is disposed in the driving module installation hole and located between the driving box cover and the heat radiator.

In one embodiment, the other side of the heat radiator is provided with a plurality of heat dissipation fins.

In one embodiment, the light source board is a light-emitting diode light source board.

In one embodiment, the light-emitting module further includes a fixing element. The driving module is provided with a central fixing portion disposed at the top of the driving module and the fixing element is detachably fixed at the central fixing portion.

The industrial lighting device having sensing function in accordance with the embodiments of the present invention may have the following advantages:

(1) In one embodiment of the present invention, the industrial lighting device includes a driving module, a light-emitting module and a sensing module. The driving module includes a driving box and a driving box cover connected to each other. The driving box has a circuit board and a sensing module connecting sheet disposed on the circuit board. The driving box cover has a sensing module installation hole. The light-emitting module has a driving module installation hole. The driving box cover passes through the driving module installation hole to fix the driving module on the light-emitting module. In this way, when the sensing module is disposed in the sensing module installation hole, the sensing module can contact the sensing module connecting sheet in order to electrically connect to the circuit board. Therefore, the industrial lighting device can integrate the driving module with the sensing module without any external sensing base, which can reduce the cost and manpower consumption of the manufacturing process of the industrial lighting device. As a result, the total cost of the industrial lighting device can be decreased. In addition, the user can replace the sensing module by another sensing module having different sensing function according to actual requirements or seal the sensing module installation hole by a sealing element. Accordingly, the industrial lighting device can be more convenient in use so as to meet different requirements.

(2) In one embodiment of the present invention, the industrial lighting device can integrate the power adjusting function, color temperature adjusting function, dimming function and sensing function with each other by a special structure. Thus, the user can adjust the brightness and power of the industrial lighting device according to actual requirements in order to provide various sensing functions. Therefore, the functionality of the industrial lighting device can be further enhanced with a view to satisfying actual requirements.

(3) In one embodiment of the present invention, the light-emitting module of the industrial lighting device includes an outer water-proof ring and an inner waterproof ring. The outer water-proof ring is disposed between the heat radiator and the light source board. The inner water-proof ring is disposed in the driving module installation hole and located between the driving box cover and the heat radiator. In addition, the industrial lighting device is further provided with two water-proof pads detachably disposed in the power adjusting module hole and the dimming module hole. The above water-proof structure design can significantly improve the water-proof performance of the industrial lighting device. As a result, the industrial lighting device can be applied to humid environments and the failure rate thereof can be further decreased. Accordingly, the industrial lighting device can be more comprehensively in application.

(4) In one embodiment of the present invention, the top surface of the driving module of the industrial lighting device is provided with a central fixing portion detachably connected to a fixing element. Thus, the user can replace the fixing element by another one according to actual requirements, such that the industrial lighting device can provide different fixing mechanisms without any adapter piece. Therefore, the functionality of the industrial lighting device can be further enhanced.

(5) In one embodiment of the present invention, the industrial lighting device is further provided with a light cover disposed on the lighting module. The light cover can be optimized via optical simulation design, so the lights emitted by the light-emitting module can be properly adjusted. As a result, the anti-glare function (UGR<19) of the industrial lighting device can be greatly improved, so the market competitiveness of the industrial lighting device can be further enhanced.

(6) In one embodiment of the present invention, the industrial lighting device can have a Bluetooth sensing module, so the industrial lighting device can provide the group-controlling function. Thus, the user can control all of the industrial lighting devices by controlling only one of the industrial lighting devices in order to monitor the operational states of these industrial lighting devices. Accordingly, the user can conveniently maintain or repair these industrial lighting devices, such that the reliability of the lighting system can be significantly improved.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 9 is a schematic view of an assistant fixing element of the industrial lighting device having sensing function in accordance with another embodiment of the present invention.

DETAILED DESCRIPTION

Figure 1:
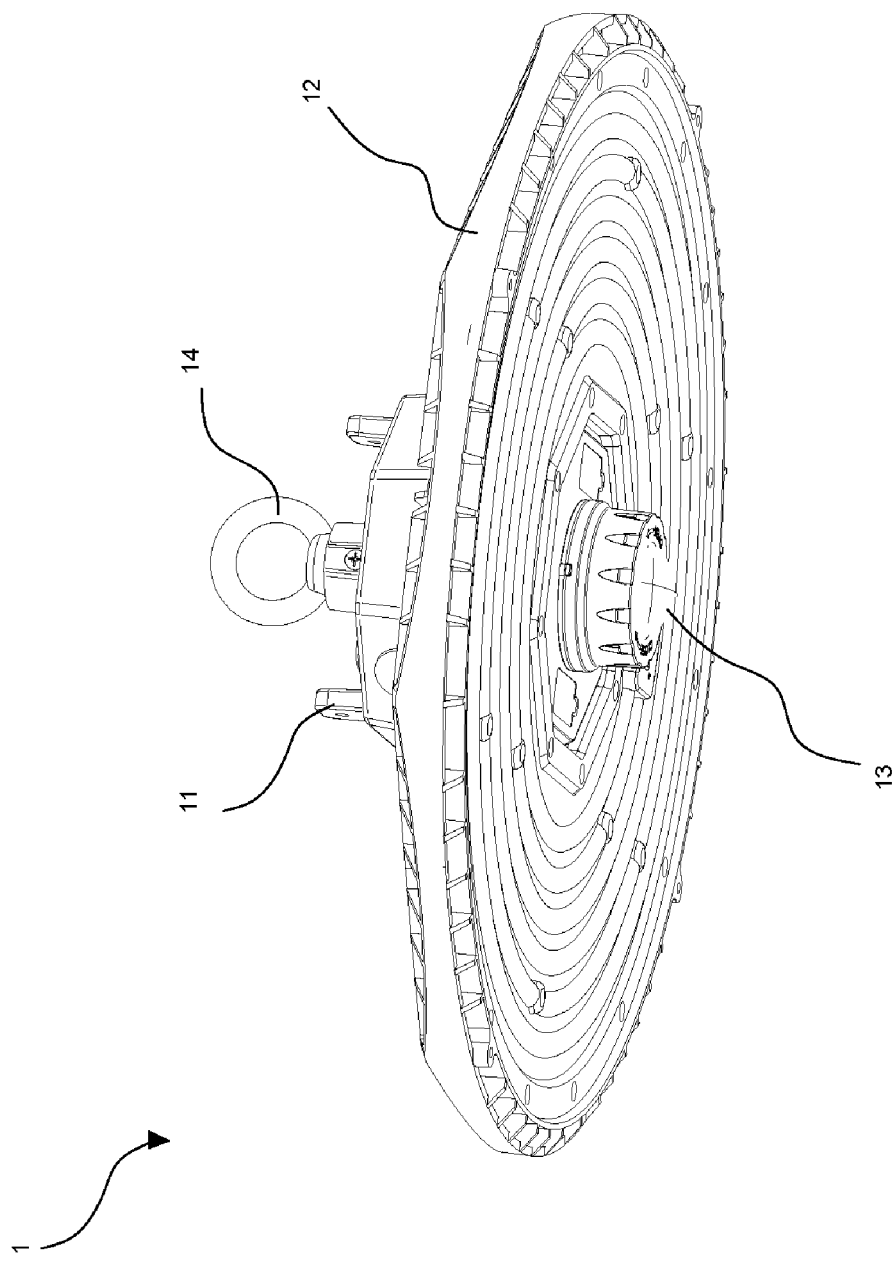
FIG. 1 is an assembly view of an industrial lighting device having sensing function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
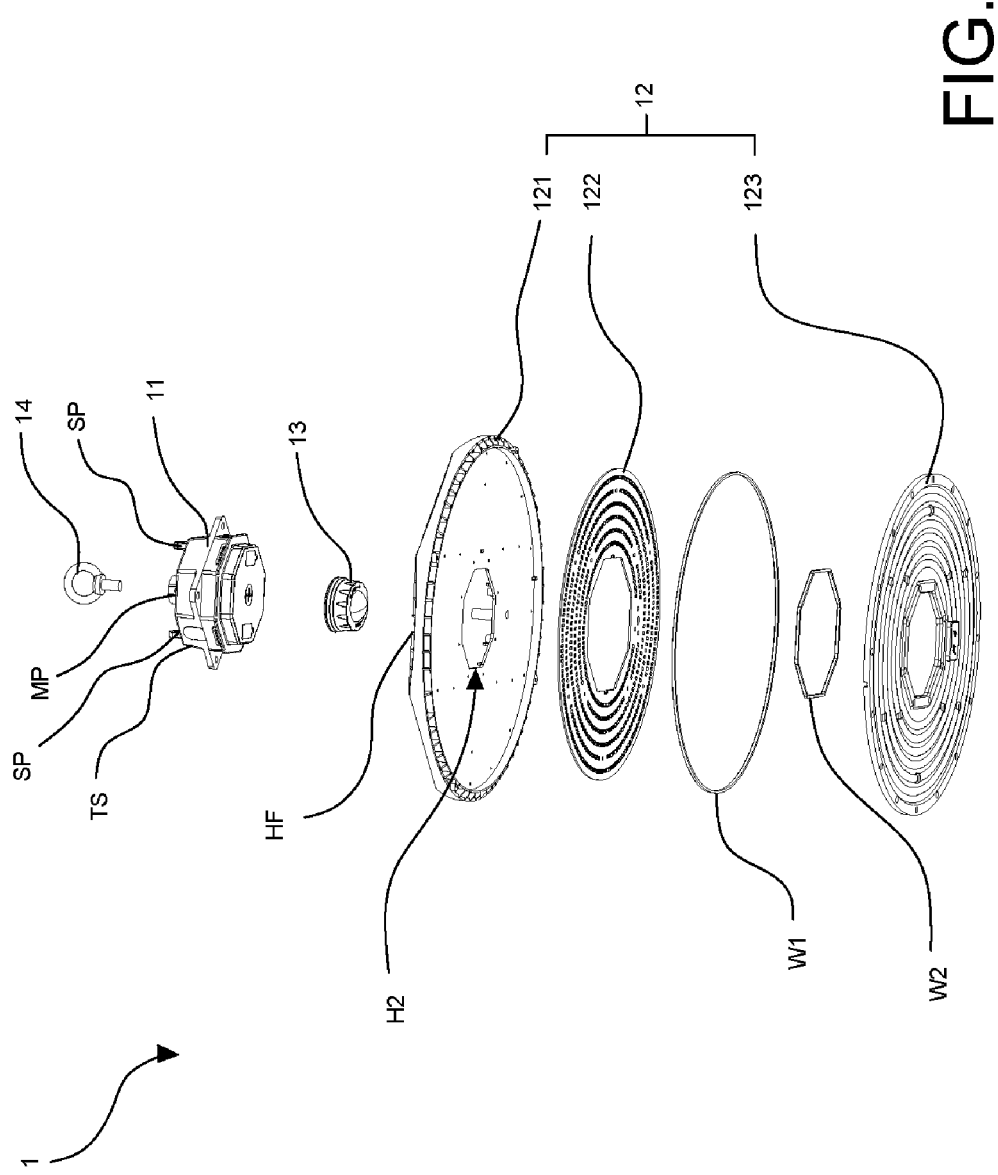
FIG. 2 is an exploded view of the industrial lighting device having sensing function in accordance with one embodiment of the present invention.
Figure 3:
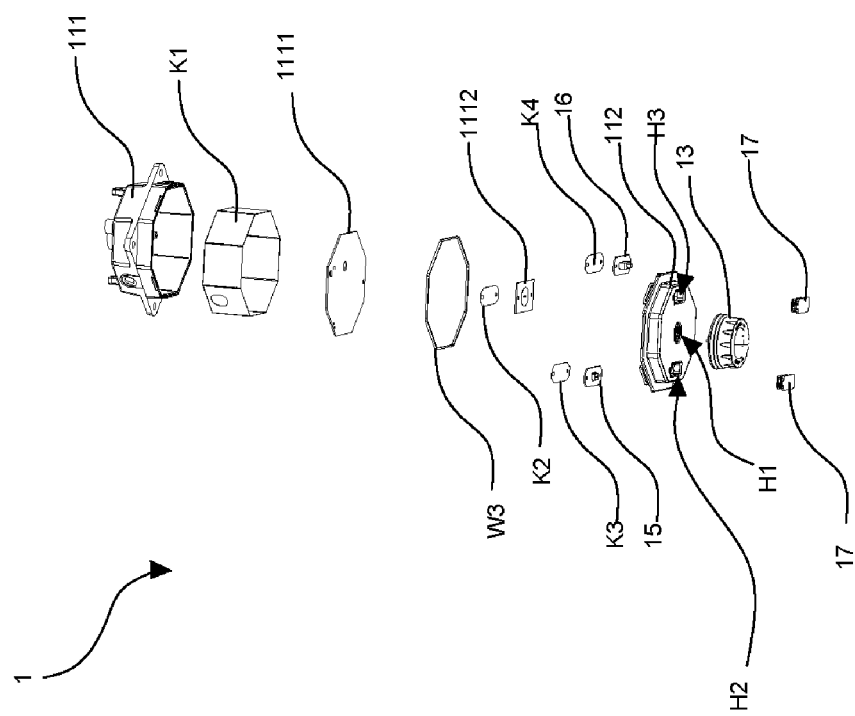
FIG. 3 is an exploded view of a driving module of the industrial lighting device having sensing function in accordance with one embodiment of the present invention.

Please refer to FIG. 1, FIG. 2 and FIG. 3. FIG. 1 and FIG. 2 are an assembly view and an exploded view of an industrial lighting device having sensing function in accordance with one embodiment of the present invention respectively. FIG. 3 is an exploded view of a driving module of the industrial lighting device having sensing function in accordance with one embodiment of the present invention. As shown in FIG. 1, FIG. 2 and FIG. 3, the industrial lighting device 1 includes a driving module 11, a light-emitting module 12, a sensing module 13 and a fixing element 14.

The driving module 11 has a driving box 111 and a driving box cover 112. The driving box 111 and the driving box cover 112 is connected to each other. The driving box cover 112 covers the opening of the driving box 11, such that an accommodating space is formed between the driving box 111 and the driving box cover 112. The driving box 11 has a circuit board 1111 and a sensing module connecting sheet 1112, which is disposed in the aforementioned accommodating space. The sensing module connecting sheet 1112 is disposed on the circuit board 1111. The driving box cover 112 is further provided with a sensing module installation hole H1. The driving module 11 is further provided with a first mylar K1, which is disposed on the inner wall of the driving box 11. Besides, the inner wall of the driving module 11 can be further provided with a driving box water-proof ring W3.

The fixing element 14 may be a hook ring. The driving module 11 has a central fixing portion MP of the top surface TS of the driving module 11. The fixing element 14 can be detachably fixed at the central fixing portion MP. One end of the fixing element 14 is provided with external thread and the central fixing portion MP is provided with internal thread, such that the fixing element 14 can be detachably fixed at the central fixing portion MP. The above structure is just for illustration instead of limitation, the fixing element 14 can be detachably fixed at the central fixing portion MP via another connecting structure.

The light-emitting module 12 includes a heat radiator 121, a light source board 122 and a lens 123. In addition, the light-emitting module 12 further has a driving module installation hole H4. The driving module installation hole H4 is disposed at the center of the heat radiator 121. The light source board 122 and the lens 123 are disposed on one side of the heat radiator 121, such that the light source board 122 is disposed between the lens 123 and the heat radiator 121. The other side of the heat radiator 121 is provided with a plurality of heat dissipation fins HF. The driving box cover 122 passes through the driving module installation hole H4, such that the driving module 11 can be fixed on the light-emitting module 12. In one embodiment, the light source board 122 may be a light-emitting diode (LED) light source board or other similar devices. Further, the light-emitting module 12 further includes an outer water-proof ring W1 and an inner water-proof ring W2. The outer water-proof ring W1 is disposed between the heat radiator 121 and the light source board 122. The inner water-proof ring W2 is disposed in the driving module installation hole H4, and located between the driving box cover 112 and the heat radiator 121.

The sensing module 13 is detachably disposed in the sensing module installation hole H1 and contacts the sensing module connecting sheet 1112 in order to electrically connect to the circuit board 1111. There is a second mylar sheet K2 between the sensing module 13 and the circuit board 1111. One end of the sensing module 13 is provided with external thread and the sensing module installation hole H1 is provided with internal thread, such that the sensing module 13 can be detachably fixed in the sensing module installation hole H1. The above structure is just for illustration instead of limitation, the sensing module 13 can be detachably fixed in the sensing module installation hole H1 via another connecting structure. In another embodiment, the sensing module 13 may be a microwave sensing module, Bluetooth (group-controlling) sensing module or other similar elements.

As set forth above, the structure design of the driving module 11 of the industrial lighting device 1 can be effectively integrated with the sensing module 13. Therefore, the sensing module 13 can contact the sensing module connecting sheet 1112 when being disposed in the sensing module installation hole H1 so as to electrically connect to the circuit board 1111. Therefore, the industrial lighting device 1 can effectively integrate the driving module 11 with the sensing module 13 without any external sensing base, which can reduce the cost and manpower consumption of the manufacturing process of the industrial lighting device 1. Thus, the total cost of the industrial lighting device 1 can be effectively decreased.

Moreover, the user can replace the sensing module 13 by another sensing module having different sensing function, such as a microwave sensing module or a Bluetooth (group-controlling) sensing module, according to actual requirements. Accordingly, the industrial lighting device 1 can be more flexible in use so as to meet different requirements.

If the sensing module 13 is a Bluetooth sensing module, the industrial lighting device 1 can provide the group-controlling function. The user can control all industrial lighting devices 1 via the Bluetooth sensing module of one of the industrial lighting devices 1 so as to obtain the operational states of these industrial lighting devices 1 and monitor these industrial lighting devices 1. Therefore, the user can conveniently maintain or repair these industrial lighting devices 1.

Further, as shown in FIG. 3, the industrial lighting device 1 can further include a power adjusting module 15, a dimming module 16 and two water-proof pads 17. The power adjusting module 15 and the dimming module 16 are disposed on the circuit board 1111, and the driving box cover 112 has a power adjusting module hole H2 and a dimming module hole H3 corresponding to the power adjusting module 15 and the dimming module 16. There are a third mylar sheet K3 and a fourth mylar sheet K4 between the power adjusting module 15 and the circuit board 1111. The above two water-proof pads 17 can be detachably disposed in the power adjusting module hole H2 and the dimming module hole H3. In one embodiment, the power adjusting module 15 and the dimming module 16 may be DIP switches, buttons, knobs or other similar elements.

The embodiment just exemplifies the present invention and is not intended to limit the scope of the present invention; any equivalent modification and variation according to the spirit of the present invention is to be also included within the scope of the following claims and their equivalents.

Figure 4:
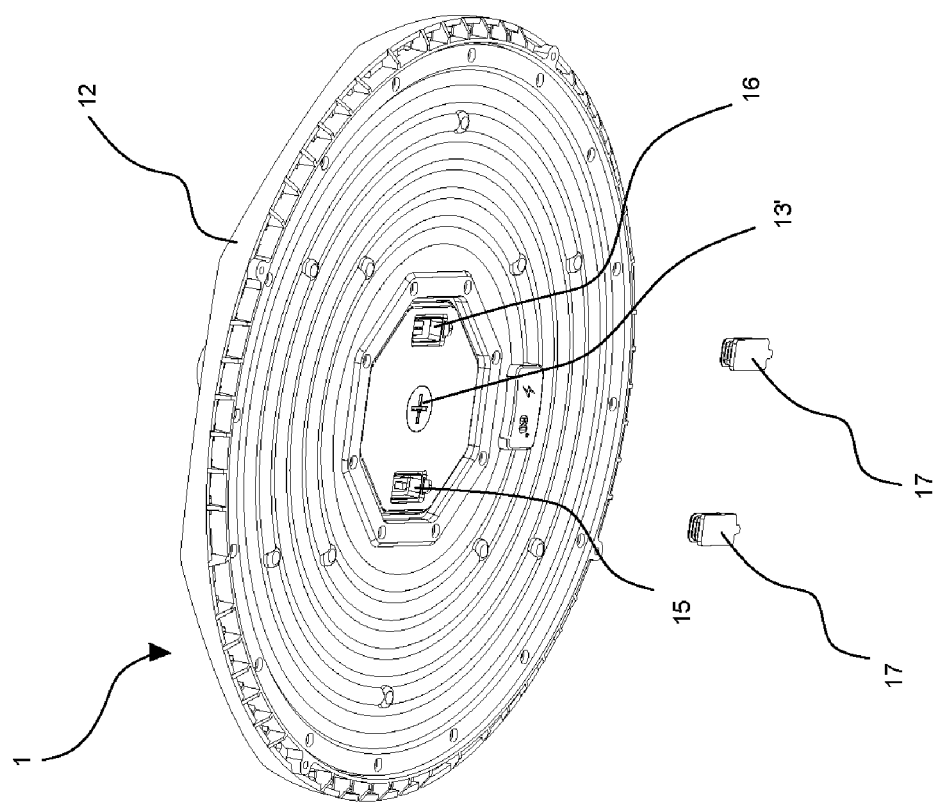
FIG. 4 is a first schematic view of the industrial lighting device having sensing function in accordance with one embodiment of the present invention.

Please refer to FIG. 4, and please also refer to FIG. 1, FIG. 2 and FIG. 3. FIG. 4 is a first schematic view of the industrial lighting device having sensing function in accordance with one embodiment of the present invention. As shown in FIG. 4, the user can remove the water-proof pad 17 of the power adjusting module hole H2 so as to perform the power adjusting function by operating the power adjusting module 15. Then, the user can further seal the power adjusting module hole H2 by the water-proof pad 17 again so as to avoid that the power adjusting module 15 or other electronic components contact water. Similarly, the user can remove the water-proof pad 17 of the dimming module hole H3 so as to perform the dimming function by operating the dimming module 16. Then, the user can further seal the dimming module hole H3 by the water-proof pad 17 again.

As described above, the light-emitting module 12 of the industrial lighting device 1 includes an outer water-proof ring W1 and an inner water-proof ring W2. The outer water-proof ring W1 is disposed between the heat radiator 121 and the light source board 122. The inner water-proof ring W2 is disposed in the driving module installation hole H4 and located between the driving box 112 and the heat radiator 121. In addition, the industrial lighting device 1 further has two water-proof pads 17 detachably disposed in the power adjusting module hole H2 and the dimming module hole H3. The above water-proof structure design can greatly enhance the water-proof performance of the industrial lighting device 1, so the failure rate of the industrial lighting device 1 can be effectively reduced when being used in a humid environment. Thus, the industrial lighting device 1 can be more comprehensive in use.

Moreover, the industrial lighting device 1 can integrate the power adjusting function, color temperature adjusting function, dimming function and sensing function with each other by a special structure. Thus, the user can adjust the brightness and power of the industrial lighting device 1 according to actual requirements in order to provide various sensing functions. Therefore, the functionality of the industrial lighting device 1 can be further enhanced with a view to satisfying actual requirements.

The embodiment just exemplifies the present invention and is not intended to limit the scope of the present invention; any equivalent modification and variation according to the spirit of the present invention is to be also included within the scope of the following claims and their equivalents.

Figure 5:
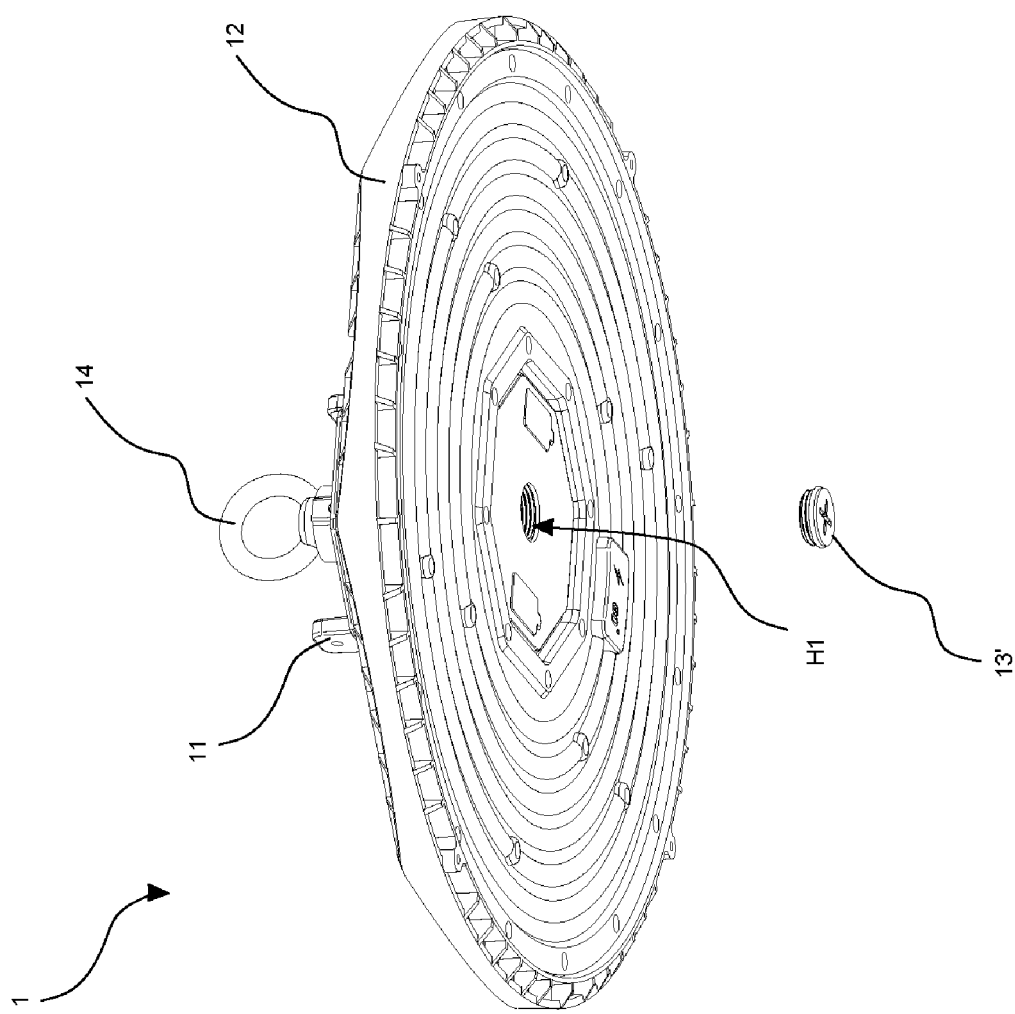
FIG. 5 is a second schematic view of the industrial lighting device having sensing function in accordance with one embodiment of the present invention.

Please refer to FIG. 5, and please also refer to FIG. 1, FIG. 2, FIG. 3 and FIG. 4. FIG. 5 is a second schematic view of the industrial lighting device having sensing function in accordance with one embodiment of the present invention. As shown in FIG. 5, if the user does not need the sensing function, the user can replace the sensing module 13 by a sealing element 13' in order to seal the sensing module installation hole H1. In one embodiment, the sealing element 13' may be a bolt, a screw or other similar elements. The above structure design can also improve the water-proof performance of the industrial lighting device 1.

Figure 6:
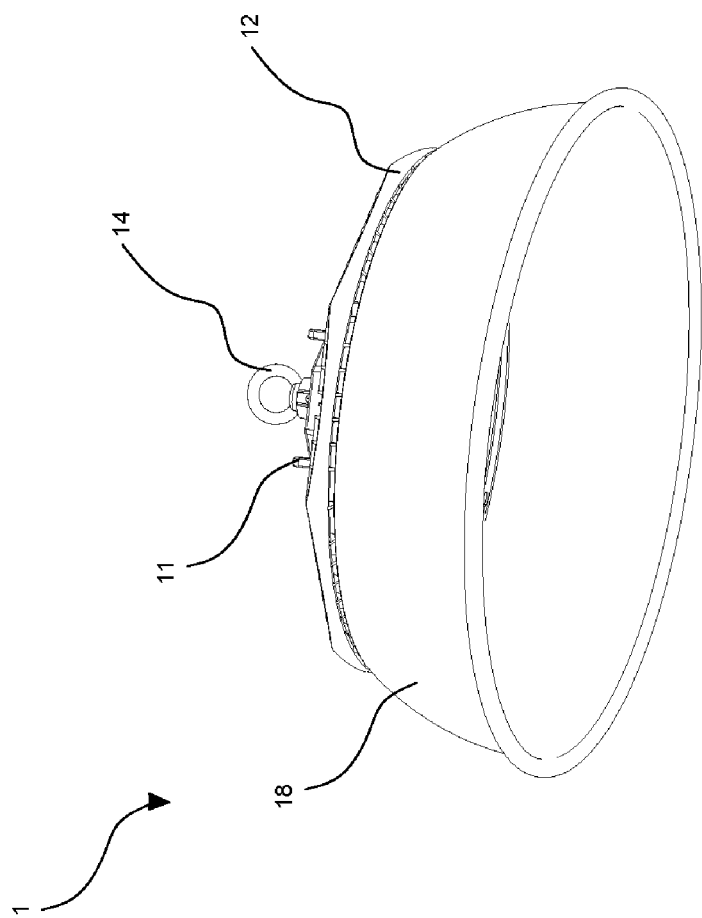
FIG. 6 is an assembly view of an industrial lighting device having sensing function in accordance with another embodiment of the present invention.

Please refer to FIG. 6, which is an assembly view of an industrial lighting device having sensing function in accordance with another embodiment of the present invention. The difference between this embodiment and the previous embodiment is that the industrial lighting device 1 of this embodiment further has a light cover 18 and the light cover 18 is disposed on the light-emitting module 12.

The light cover 18 can be optimized by optical simulation design. Therefore, the lights emitted by the light-emitting module 12 can be properly adjusted by the light cover 18. Accordingly, the anti-glare function of the industrial lighting device 1 can be dramatically improved (UGR<19). As a result, the overall performance of the industrial lighting device 1 can be further optimized. Thus, the market competitiveness of the industrial lighting device 1 can be effectively increased.

The embodiment just exemplifies the present invention and is not intended to limit the scope of the present invention; any equivalent modification and variation according to the spirit of the present invention is to be also included within the scope of the following claims and their equivalents.

It is worthy to point out that the sensing functions of most of currently available industrial lighting devices (such as mining lamps, etc.) need to be realized by an external sensing base. However, the external sensing base will greatly increase the cost and manpower consumption in the manufacturing process of these industrial lighting device, Thus, the total cost of these industrial lighting devices is increased. Most of the currently available industrial lighting devices with sensing function cannot provide the dimming function and the power regulation function at the same time, so the cost-performance ratio of these industrial lighting devices cannot be effectively increased. For the same reason, these industrial lighting devices cannot create great user experience. The unified glare rating (UGR) of most currently available industrial lighting devices is between 28~30, which cannot meet the technical requirements of the standard UGR (<19), so there industrial lighting devices cannot increase the market competitiveness thereof. On the contrary, according to one embodiment of the present invention, the industrial lighting device includes a driving module, a light-emitting module and a sensing module. The driving module includes a driving box and a driving box cover connected to each other. The driving box has a circuit board and a sensing module connecting sheet disposed on the circuit board. The driving box cover has a sensing module installation hole. The light-emitting module has a driving module installation hole. The driving box cover passes through the driving module installation hole to fix the driving module on the light-emitting module. In this way, when the sensing module is disposed in the sensing module installation hole, the sensing module can contact the sensing module connecting sheet in order to electrically connect to the circuit board. Therefore, the industrial lighting device can integrate the driving module with the sensing module without any external sensing base, which can reduce the cost and manpower consumption of the manufacturing process of the industrial lighting device. As a result, the total cost of the industrial lighting device can be decreased. In addition, the user can replace the sensing module by another sensing module having different sensing function according to actual requirements or seal the sensing module installation hole by a sealing element. Accordingly, the industrial lighting device can be more convenient in use so as to meet different requirements.

Also, according to one embodiment of the present invention, the industrial lighting device can integrate the power adjusting function, color temperature adjusting function, dimming function and sensing function with each other by a special structure. Thus, the user can adjust the brightness and power of the industrial lighting device according to actual requirements in order to provide various sensing functions. Therefore, the functionality of the industrial lighting device can be further enhanced with a view to satisfying actual requirements.

In addition, according to one embodiment of the present invention, the light-emitting module of the industrial lighting device includes an outer water-proof ring and an inner water-proof ring. The outer water-proof ring is disposed between the heat radiator and the light source board. The inner water-proof ring is disposed in the driving module installation hole and located between the driving box cover and the heat radiator. In addition, the industrial lighting device is further provided with two water-proof pads detachably disposed in the power adjusting module hole and the dimming module hole. The above water-proof structure design can significantly improve the water-proof performance of the industrial lighting device. As a result, the industrial lighting device can be applied to humid environments and the failure rate thereof can be further decreased. Accordingly, the industrial lighting device can be more comprehensively in application.

Further, according to one embodiment of the present invention, the top surface of the driving module of the industrial lighting device is provided with a central fixing portion detachably connected to a fixing element. Thus, the user can replace the fixing element by another one according to actual requirements, such that the industrial lighting device can provide different fixing mechanisms without any adapter piece. Therefore, the functionality of the industrial lighting device can be further enhanced.

Moreover, according to one embodiment of the present invention, the industrial lighting device is further provided with a light cover disposed on the lighting module. The light cover can be optimized via optical simulation design, so the lights emitted by the light-emitting module can be properly adjusted. As a result, the anti-glare function (UGR<19) of the industrial lighting device can be greatly improved, so the market competitiveness of the industrial lighting device can be further enhanced.

Furthermore, according to one embodiment of the present invention, the industrial lighting device can have a Bluetooth sensing module, so the industrial lighting device can provide the group-controlling function. Thus, the user can control all of the industrial lighting devices by controlling only one of the industrial lighting devices in order to monitor the operational states of these industrial lighting devices. Accordingly, the user can conveniently maintain or repair these industrial lighting devices, such that the reliability of the lighting system can be significantly improved. As previously stated, the industrial lighting device according to the embodiments of the present invention can definitely achieve great technical effects.

Figure 7:
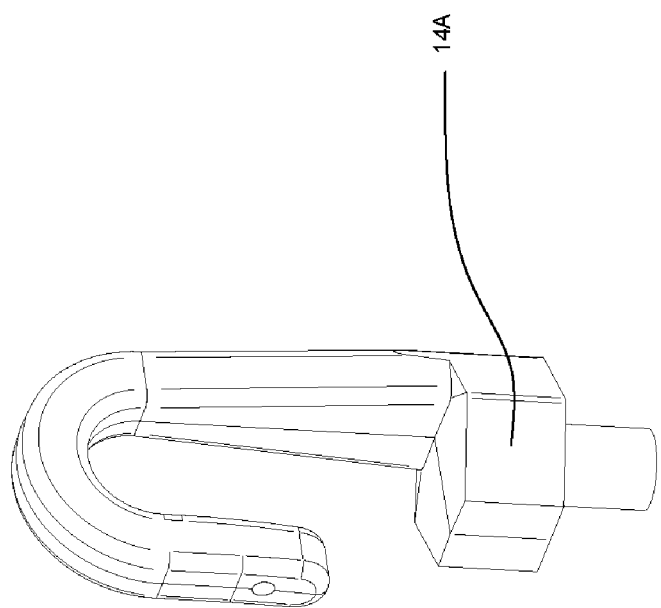
FIG. 7 is a first schematic view of a fixing element of the industrial lighting device having sensing function in accordance with another embodiment of the present invention.
Figure 8:
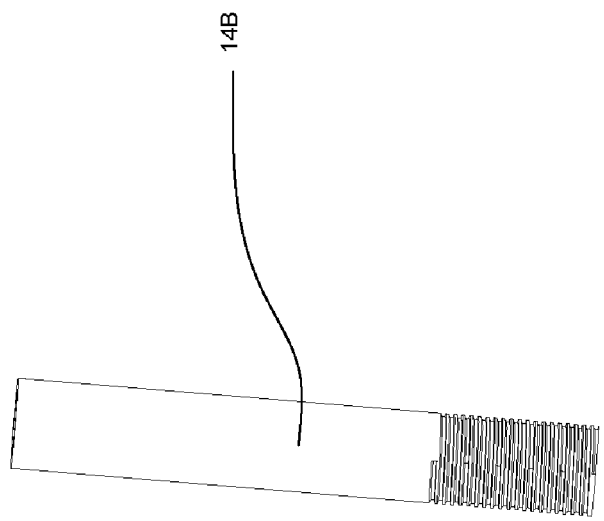
FIG. 8 is a second schematic view of a fixing element of the industrial lighting device having sensing function in accordance with another embodiment of the present invention.

Please refer to FIG. 7 and FIG. 8, which are a first schematic view and a second schematic view of a fixing element of the industrial lighting device having sensing function in accordance with another embodiment of the present invention respectively. Please also refer to FIG. 2. As shown in FIG. 7, the fixing element 14 (ring hook) shown in FIG. 2 can be replaced by the fixing element 14A (hanging hook) shown in FIG. 7 in order to satisfy the requirements of the user.

As shown in FIG. 8, the fixing element 14 (ring hook) shown in FIG. 2 can be replaced by the fixing element 14B (hanging post) shown in FIG. 7 in order to satisfy the requirements of the user.

The embodiment just exemplifies the present invention and is not intended to limit the scope of the present invention; any equivalent modification and variation according to the spirit of the present invention is to be also included within the scope of the following claims and their equivalents.

Please refer to FIG. 9, which is a schematic view of an assistant fixing element of the industrial lighting device having sensing function in accordance with another embodiment of the present invention. Please also refer to FIG. 2. As shown in FIG. 9, the industrial lighting device 1 includes an assistant fixing element 19 and the top surface TS of the driving module 11 are further provided with two fixing sheets SP. The above assistant fixing element 19 can be fixed at the two fixing plates SP via two locking elements Fx.

As previously stated, the industrial lighting device 1 can provide different fixation mechanisms without any adapter piece. Therefore, the industrial lighting device 1 can be more comprehensively in application and flexible in use. In this way, the industrial lighting device 1 can conform to actual requirements.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the industrial lighting device includes a driving module, a light-emitting module and a sensing module. The driving module includes a driving box and a driving box cover connected to each other. The driving box has a circuit board and a sensing module connecting sheet disposed on the circuit board. The driving box cover has a sensing module installation hole. The light-emitting module has a driving module installation hole. The driving box cover passes through the driving module installation hole to fix the driving module on the light-emitting module. In this way, when the sensing module is disposed in the sensing module installation hole, the sensing module can contact the sensing module connecting sheet in order to electrically connect to the circuit board. Therefore, the industrial lighting device can integrate the driving module with the sensing module without any external sensing base, which can reduce the cost and manpower consumption of the manufacturing process of the industrial lighting device. As a result, the total cost of the industrial lighting device can be decreased. In addition, the user can replace the sensing module by another sensing module having different sensing function according to actual requirements or seal the sensing module installation hole by a sealing element. Accordingly, the industrial lighting device can be more convenient in use so as to meet different requirements.

Also, according to one embodiment of the present invention, the industrial lighting device can integrate the power adjusting function, color temperature adjusting function, dimming function and sensing function with each other by a special structure. Thus, the user can adjust the brightness and power of the industrial lighting device according to actual requirements in order to provide various sensing functions. Therefore, the functionality of the industrial lighting device can be further enhanced with a view to satisfying actual requirements.

In addition, according to one embodiment of the present invention, the light-emitting module of the industrial lighting device includes an outer water-proof ring and an inner water-proof ring. The outer water-proof ring is disposed between the heat radiator and the light source board. The inner water-proof ring is disposed in the driving module installation hole and located between the driving box cover and the heat radiator. In addition, the industrial lighting device is further provided with two water-proof pads detachably disposed in the power adjusting module hole and the dimming module hole. The above water-proof structure design can significantly improve the water-proof performance of the industrial lighting device. As a result, the industrial lighting device can be applied to humid environments and the failure rate thereof can be further decreased. Accordingly, the industrial lighting device can be more comprehensively in application.

Further, according to one embodiment of the present invention, the top surface of the driving module of the industrial lighting device is provided with a central fixing portion detachably connected to a fixing element. Thus, the user can replace the fixing element by another one according to actual requirements, such that the industrial lighting device can provide different fixing mechanisms without any adapter piece. Therefore, the functionality of the industrial lighting device can be further enhanced.

Moreover, according to one embodiment of the present invention, the industrial lighting device is further provided with a light cover disposed on the lighting module. The light cover can be optimized via optical simulation design, so the lights emitted by the light-emitting module can be properly adjusted. As a result, the anti-glare function (UGR<19) of the industrial lighting device can be greatly improved, so the market competitiveness of the industrial lighting device can be further enhanced.

Furthermore, according to one embodiment of the present invention, the industrial lighting device can have a Bluetooth sensing module, so the industrial lighting device can provide the group-controlling function. Thus, the user can control all of the industrial lighting devices by controlling only one of the industrial lighting devices in order to monitor the operational states of these industrial lighting devices. Accordingly, the user can conveniently maintain or repair these industrial lighting devices, such that the reliability of the lighting system can be significantly improved.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An industrial lighting device having sensing function, comprising:
    a driving module having a driving box and a driving box cover connected to each other, wherein the driving box has a circuit board disposed in the driving box and a sensing module connecting sheet disposed on the circuit board, and the driving box cover has a sensing module installation hole;
    a light-emitting module comprising a heat radiator, a light source board and a lens, wherein the heat radiator is provided with a driving module installation hole disposed at a center of the heat radiator, and a plurality of heat dissipation fins extending from one side of the heat radiator to another side of the heat radiator, wherein the driving box cover passes through the driving module installation hole to fix the driving module at the light-emitting module, wherein the light source board and the lens are disposed at one side of the heat radiator, whereby the light source board is disposed between the lens and the heat radiator, and surrounded by the heat dissipation fins;
    a sensing module detachably disposed in the sensing module installation hole and contacts the sensing module connecting sheet so as to electrically connect to the circuit board; and
    a light cover disposed on the light-emitting module, wherein one end of the light cover is ring-shaped and directly contacts the heat dissipation fins.

2. The industrial lighting device having sensing function as claimed in claim 1, further comprising a power adjusting module disposed on the circuit board, wherein the driving box cover has a power adjusting module hole corresponding to the power adjusting module.

3. The industrial lighting device having sensing function as claimed in claim 2, further comprising a dimming module disposed on the circuit board, wherein the driving box cover has a dimming module hole corresponding to the dimming module.

4. The industrial lighting device having sensing function as claimed in claim 3, further comprising two water-proof pads detachably disposed in the power adjusting module hole and the dimming module hole respectively.

5. The industrial lighting device having sensing function as claimed in claim 1, wherein the light-emitting module further comprises an outer water-proof ring and an inner water-proof ring, wherein the outer water-proof ring is disposed between the heat radiator and the light source board, and the inner water-proof ring is disposed in the driving module installation hole and located between the driving box cover and the heat radiator.

6. The industrial lighting device having sensing function as claimed in claim 1, wherein the light source board is a light-emitting diode light source board.

7. The industrial lighting device having sensing function as claimed in claim 1, further comprising a fixing element, wherein the driving module is provided with a central fixing portion disposed at a top of the driving module and the fixing element is detachably fixed at the central fixing portion.

* * * * *